United States Patent
Bianchi

(10) Patent No.: US 6,392,694 B1
(45) Date of Patent: *May 21, 2002

(54) METHOD AND APPARATUS FOR AN AUTOMATIC CAMERA SELECTION SYSTEM

(75) Inventor: Michael Haysom Bianchi, Madison, NJ (US)

(73) Assignee: Telcordia Technologies, Inc., Morristown, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/185,053

(22) Filed: Nov. 3, 1998

(51) Int. Cl.[7] .................................................. H04N 5/225
(52) U.S. Cl. ....................................................... 348/169
(58) Field of Search ................................ 348/169, 170, 348/143, 155, 171–172, 211, 214, 14.01, 14.07, 14.08, 14.09, 14.1, 14.11, 14.12, 14.14; 455/3.05, 3.06

(56) References Cited

U.S. PATENT DOCUMENTS

| | | | |
|---|---|---|---|
| 5,434,617 A | 7/1995 | Bianchi | 348/170 |
| 5,610,653 A | 3/1997 | Abecassis | 348/110 |
| 5,767,897 A * | 6/1998 | Howell | 348/15 |
| 5,828,769 A | 10/1998 | Burns | 382/118 |
| 5,845,009 A | 12/1998 | Marks et al. | 382/228 |
| 5,859,623 A | 1/1999 | Meyn et al. | 345/1 |
| 5,898,459 A | 4/1999 | Smith et al. | 348/219 |
| 5,990,931 A * | 11/1999 | Nimri et al. | 348/15 |

* cited by examiner

Primary Examiner—Vu Le
(74) Attorney, Agent, or Firm—Joseph Giordano; William A. Schoneman

(57) ABSTRACT

An automatic camera selection system selects among different video sources based on image analysis of the video signals from one or more available video sources. In controlling the selection of video sources, the system can combine several sources to make images using elements from those several sources. In addition, the system can instruct other elements of the system to act differently to aid in the collection of appropriate video signals. All actions of the system are controlled by the system software, with no operator intervention required. In a preferred embodiment, the video selection system records an auditorium type of presentation for display, via recording or transmission, to remote audiences. The system selects from a number of video cameras, including automatic tracking cameras that follow a person on the auditorium stage. In addition, the system instructs the tracking cameras to operate in different modes, so as to produce images suitable to be used alone or in combination with other images, such as a composite image of a presenter and visual aid, such as projected slide images.

19 Claims, 6 Drawing Sheets

VIDEO DISPLAY OF SLIDE
ANALYSIS ALGORITHM ON
COMPUTER CONSOLE

SELECTED VIDEO TO
PROGRAM & VCR

VIDEO FROM TRACKING CAMERA

THE SLIDE IMAGE TAKEN
BY THE SLIDE CAMERA

METHOD AND APPARATUS FOR AN AUTOMATIC CAMERA SELECTION SYSTEM

FIELD OF THE INVENTION

The present invention relates to an automatic camera selection system. More specifically, the present invention relates to an automatic system for video recording an auditorium type presentation, including a speaker and visual aids.

BACKGROUND OF THE INVENTION

In 1994, automatic camera control software, originally designated "I-See-You™™", now called the "AutoAuditorium™ Tracking Camera", had been developed at Bellcore for automatically tracking a speaker making a presentation in an auditorium type environment. It was later realized that a computer program using some of the same software algorithms could analyze a television image of the visual aid projection screen (hereinafter called the "slide image"), where a speaker shows visual aids for his or her talk. The software analysis could determine whether or not there was an interesting slide image on the projection screen (that is, the screen was not blank). Having determined that there was an interesting slide image, the program, designated "I-See-You Director", could then instruct the I-See-You camera control software to switch the tracking mode to one where the I-See-You Tracking Camera kept the moving speaker in corner mode, (e.g., the lower-left corner of the tracking camera image). Then, by using the special effects capability of a video mixer, the image of the slide and the image of the person giving the talk could be electronically mixed, thus giving a remote audience both of the images they were likely to want to see.

When the slide image was found to be blank, the I-See-You Director software could instruct the I-See-You camera control software to again switch back to the normal mode; namely, that of keeping the moving speaker in the center of the tracking camera image, and to instruct the video mixer to select the tracking camera image as the program for the remote audience.

Experiments conducted at Bellcore in February, March and April of 1994 demonstrated that two software systems, I-See-You camera control and I-See-You Director, could share the same computer hardware and perform their separate algorithms without interfering significantly with each other. Moreover, the I-See-You Director software was capable of instructing the Video Mixer to select among several video inputs at the appropriate times, and the resulting program was found to be acceptable to a human audience.

A video tape, entitled "Electric Vehicles—A Current Report", Michael Bianchi, Apr. 25, 1194, was made using the I-See-You camera control software and I-See-You Director software together. The tape shows I-See-You camera control software following the speaker as he gives the talk, both in normal and corner mode, and the I-See-You Director software selecting between the special effect of speaker image and slide image together, and speaker image alone.

In order to further develop the I-See-You camera control software and the I-See-You Director software for the case of a typical auditorium talk, which is a single speaker, standing on a stage, talking to an audience, and using projected visual aids, a set of design goals was established:

a) The system should be relatively inexpensive.
b) The system should produce acceptable results, most of the time, without human intervention.
c) The system should impose few, if any, restrictions on the actions of the speaker.

Accordingly, it is an object of the present invention to provide an automatic camera control method and apparatus which achieves the aforementioned objectives.

SUMMARY OF THE INVENTION

In accordance with an illustrative embodiment of the present invention, an automatic camera selection system records an auditorium type of presentation for displaying to a remote audience. Note that the audience may be remote in terms of space or time. The displayed presentation includes composite images of a presenter and a visual aid, such as a projected slide image. The inventive system is computer controlled, and performs the following steps:

a) setting predetermined initial parameters,
b) collecting a slide image, which is a video frame obtained from a camera pointed at the visual aid, hereinafter denoted as the "slide camera." The image from the slide camera is hereinafter referred to as the "slide image."
c) determining a current video-noise threshold,
d) determining if there is motion in the slide image,
e) determining if the slide image is blank or not,
f) collecting a presenter image, where the presenter image is a video frame obtained from a tracking camera,
g) selecting and displaying appropriate images to the remote audience.

The displayed images of step g), above, are selected by the inventive software, in accordance with the following guidelines:

the slide image is selected when there is motion detected;
when appropriate, composite images are selected which include a combination of the presenter image and the slide image;
static or blank slide images are avoided; and
the presenter image is withheld from display while the tracking camera is being repositioned.

To implement the above described procedure, the system computer controls both a tracking camera and a slide camera, where the tracking camera is capable of viewing both the presenter and the visual aid, as well as the auditorium environment, if desired, while the slide camera is set up to view the visual aid. In addition, the video signals of the system cameras are transferred, as required, to:

a) video digitizers and buffers within the control computer for storage and image analysis,
b) a video mixer, where the video signals are selected, wither individually or in combination, for display to the remote audiences.

In addition, Video Distribution Amplifiers may be used to aid in the video signal transfers. Illustratively, the selection process is controlled by the system software, in accordance with the above described guidelines.

In addition to the tracking camera and slide camera inputs, the video mixer may also receive additional video signal inputs from other camera sources, which could be selected by the system software as well.

An illustrative embodiment of the present invention is more fully described below in conjunction with the following drawings.

DETAILED DESCRIPTION OF THE INVENTION

One embodiment of the present invention is designated hereinafter as the "AutoAuditorium" system, which is the environment and camera system used to capture a presentation for either recording, or broadcast, or both. In addition, the software that automatically controls a tracking camera within a AutoAuditorium system is designated hereinafter as "AutoAuditorium Tracking Camera" software, while an additional software system that communicates with both a tracking camera and a slide camera within a AutoAuditorium system is designated hereinafter as "AutoAuditorium Director" software. Incorporated herein by reference is U.S. Pat. No. 5,434,617 entitled, "Automatic Tracking Camera Control System," to the inventor of this application and assigned to the assignee of this application, which describes the aforementioned AutoAuditorium Tracking Camera.

Figure 1:
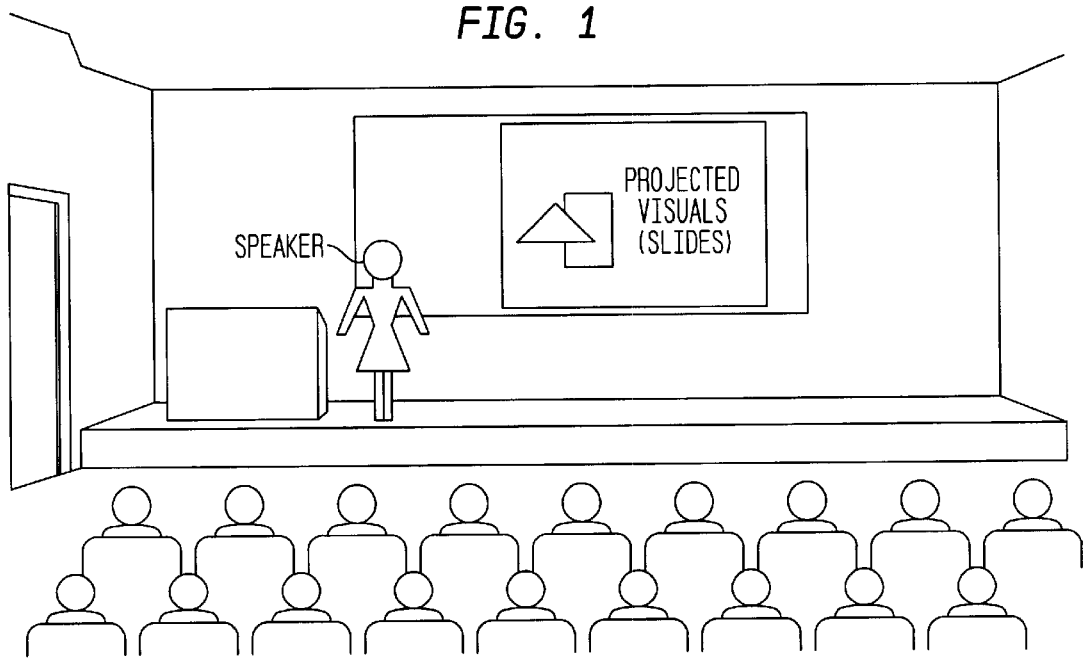
FIG. 1 shows a typical operating environment, in accordance with the invention.

FIG. 1 shows a typical AutoAuditorium operating environment, which is used as a basis for the inventive AutoAuditorium system. It is essentially a conference room with an obvious place for the speaker to stand while giving a presentation. There is also an obvious place where visual aids used in the presentation are likely to be shown. For purposes of the following discussion, the visual aids will be identified as "slides", and the "person" will always be the speaker giving the presentation.

Figure 2:
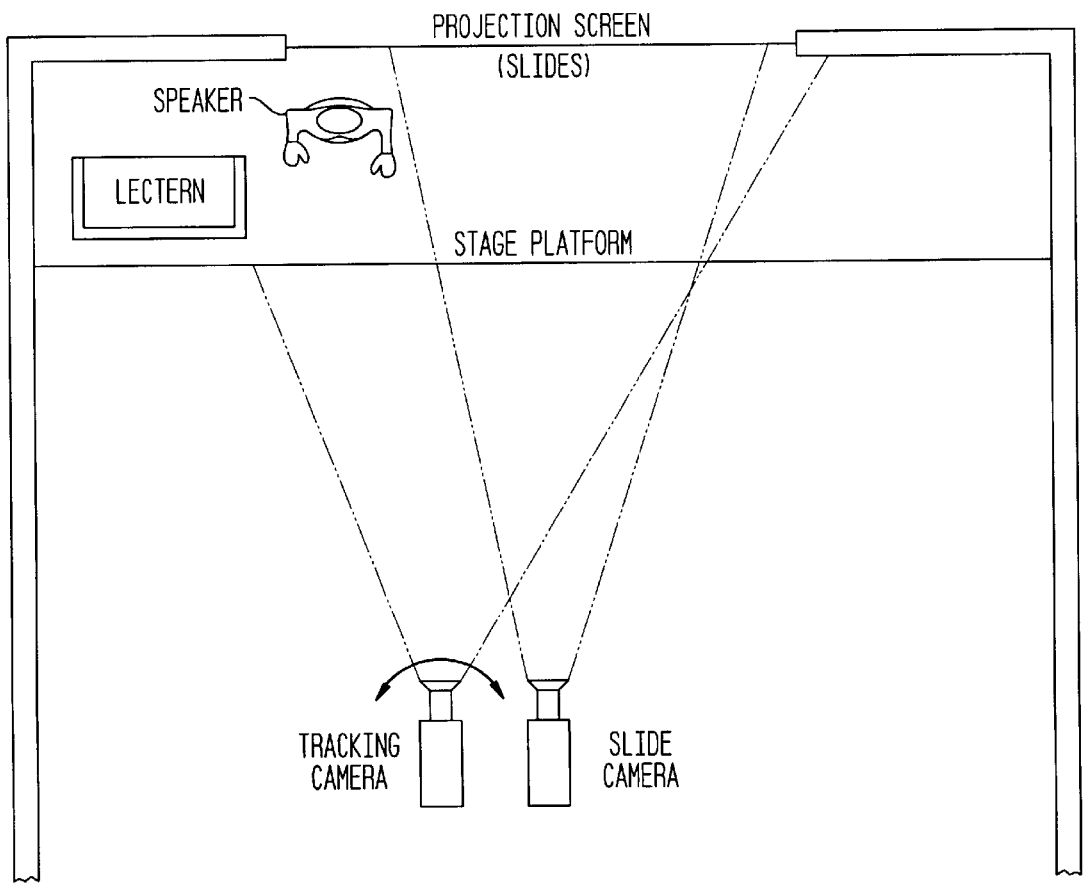
FIG. 2 shows the typical operating environment of FIG. 1, as seen from above.

FIG. 2 illustrates the placement of the two cameras essential to the inventive system, and their relationship to the stage area of the room. The slide camera is used to look at the visual aids (e.g., slides), and the tracking camera is the AutoAuditorium Tracking Camera used to follow the person automatically as he or she moves around. If there is no slide on the screen, the AutoAuditorium Director software will instruct the tracking camera to take a normal picture of the person, using normal AutoAuditorium Tracking Camera algorithms. This is one of the possible images that the AutoAuditorium Director software system produces using the AutoAuditorium Tracking Camera.

As an example, the following drawings illustrate another image that the AutoAuditorium Director system produces. That is, when there is a slide on the screen, the inventive system constructs a combined image that shows both the slide and the person.

Figure 3:
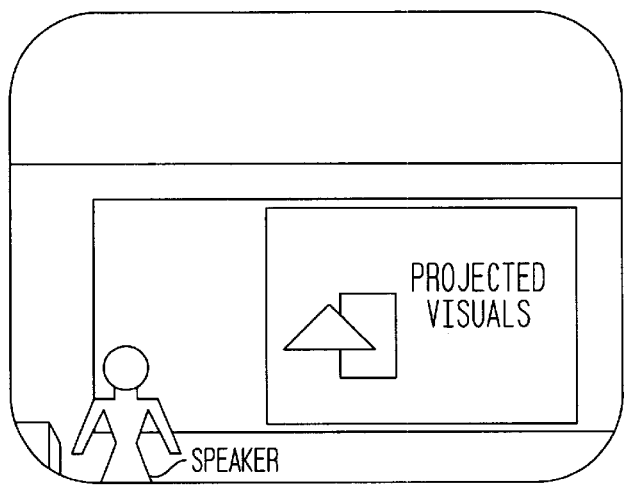
FIG. 3 depicts a corner shot, taken illustratively with the AutoAuditorium Tracking Camera, suitable for combination with a slide image.

FIG. 3 is one part of that combined image, constructed by instructing the AutoAuditorium Tracking Camera software to place the person being tracked in the lower-left corner of the tracking camera's image. This is referred to as a "corner shot".

Figure 4:
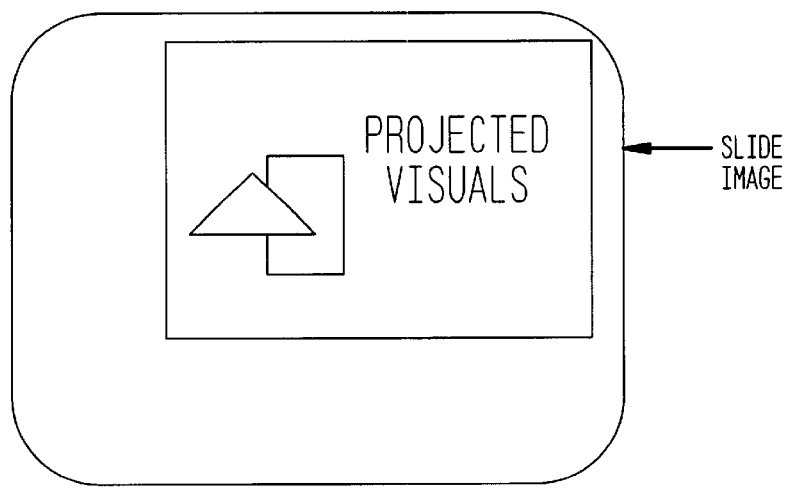
FIG. 4 depicts a slide image, suitable for combination with an image of a speaker.

FIG. 4 is the other part of that combined image, which is taken by the slide camera, and which is referred to as the "slide image". Note that the slide itself is not centered in, and does not fill the frame of, the television image.

Figure 5:
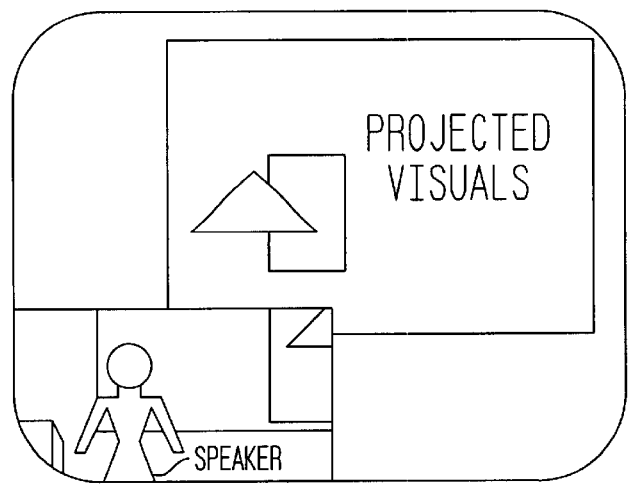
FIG. 5 depicts a combination shot, composed of parts of the corner shot and the slide image.

FIG. 5 is the result of combining the two previous images, using the special effects capability of a video mixer. This is referred to as a "combination shot". Note that, in this particular case, part of the slide is visible within a portion of the corner shot. The corner shot in this example occupies about 20% of the image area, while the actual slide image covers about 50%.

Certain assumptions have been made in order to implement the inventive system in accordance with its aforementioned design goals. These assumptions are summarized below:

a) The visual aids to be analyzed are in a known position within the slide image, which can be defined at system installation or system set-up. (This requirement can be relaxed in some special cases.) This known position is called the "Search Box".

b) If it is possible for the person to walk in front of the screen in such a way that his or her head would be within the Search Box of the slide image, then it should also be possible to either:

determine which portion of the Search Box may be involved, and define a "Block Box" over that portion, so that motion within the Block Box may be ignored, or accept the premise that the algorithms may sometime switch to the slide image because they cannot discriminate between an image of a slide on the screen and an image of a person standing in front of the screen.

d) In the combination shot, the portion of the image that is the person is usually obtainable. This implies either that we can count on the person being in a well defined area where we can point a camera, or that a tracking system, such as AutoAuditorium Tracking Camera control software, will keep the person in view most of the time.

e) Failure to select the proper image for the remote audience is not a serious flaw, provided it doesn't happen very often.

Figure 6:
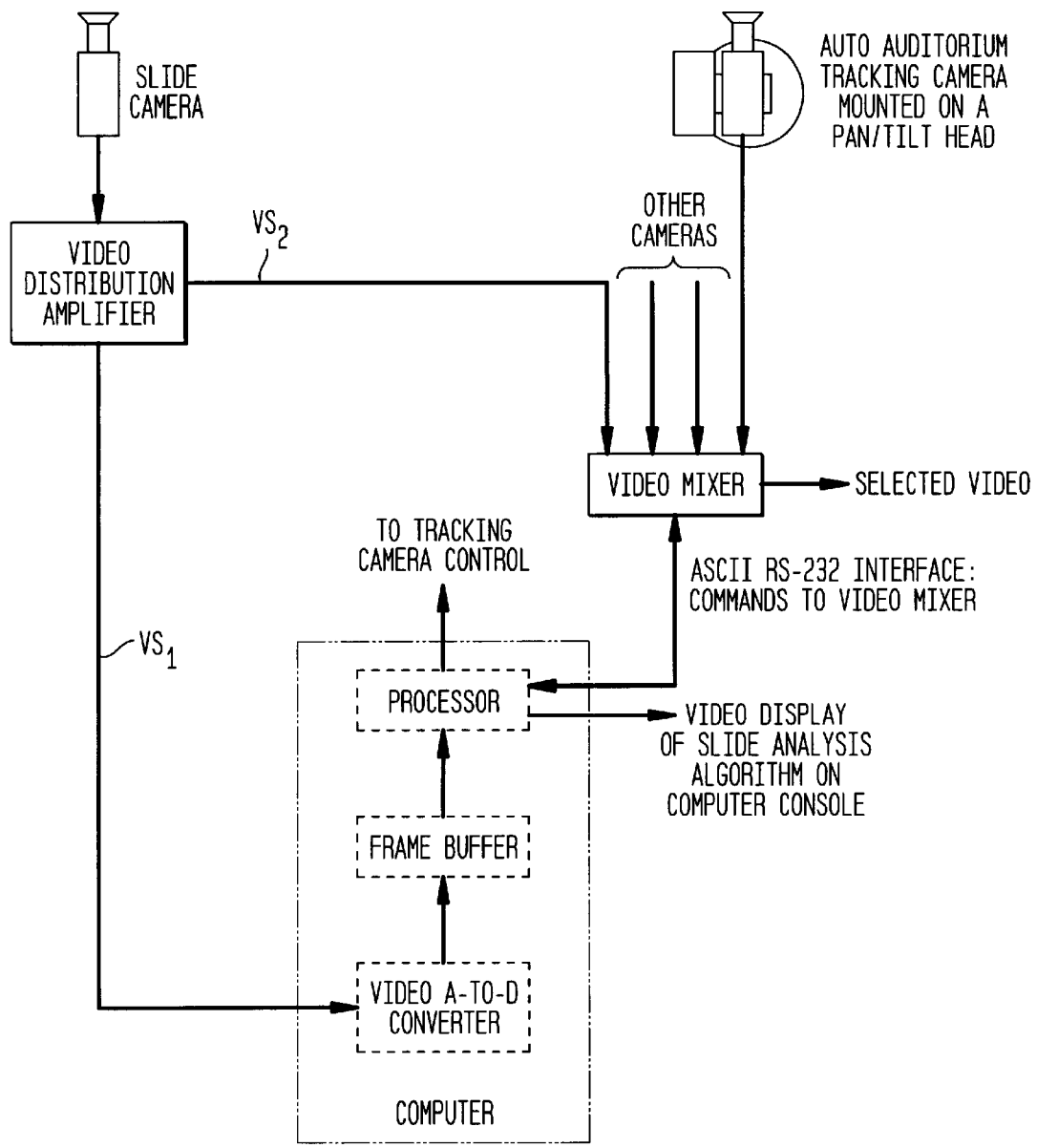
FIG. 6 is a block diagram of the inventive system architecture, including FIGS. 6A, 6B, 6C and 6D which incorporate the shots from FIGS. 4, 8–11, 5 and 3, respectively.

FIG. 6 diagrams the system architecture of the inventive AutoAuditorium system. This system can be run on a PC-style Computer with the following components:

a Processor, to run the AutoAuditorium Director software program, which implements the Slide Analysis algorithm (to be described later), the Video Mixer control protocol, and other supporting software functions;

an optional Frame Buffer, for storing a video image as digital data, if required; and a Video A-to-D (Analog-to-Digital) Converter, for converting video image signals into digital image data, if required.

The individual components of the AutoAuditorium Tracking Camera control system are not shown in FIG. 6 for simplicity. However, the same Computer uses the same Processor to run the AutoAuditorium Tracking Camera algorithms simultaneously with the AutoAuditorium Director algorithms. Illustratively, the AutoAuditorium Tracking Camera portion of the system and the AutoAuditorium Director portion of the system each has its own Video A-to-D Converter and Frame Buffer.

Figure 6A:
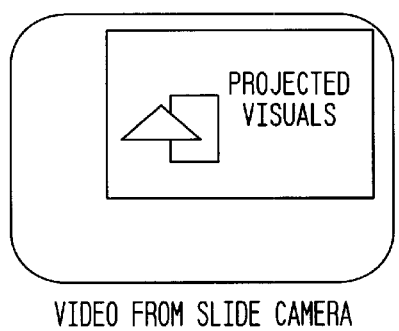
Figure 6B:
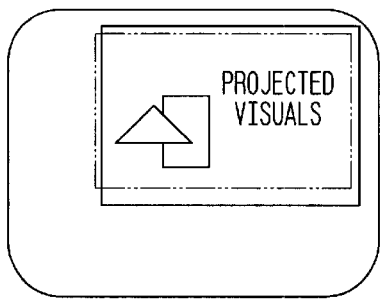
Figure 6C:
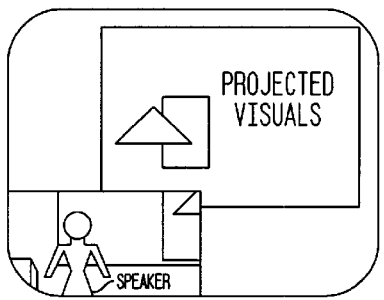
Figure 6D:
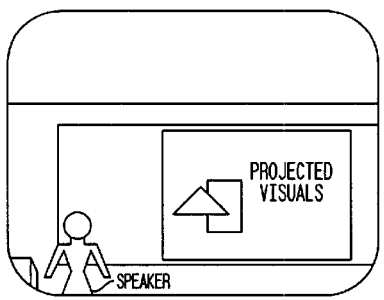

Referring again to FIG. 6, the basic operation of the inventive system is as follows:

1) The video signal from the Slide Camera (FIG. 6a) is duplicated by the Video Distribution Amplifier. The two identical video signals ($VS_1$ and $VS_2$) are outputted from the Video Distribution Amplifier to the Computer and the Video Mixer, respectively. As an alternative, other methods of obtaining identical video signals could also be used.
2) Video signal $VS_1$ is captured by the Video A-to-D converter, and is stored as digital image data in the Frame Buffer.
3) The Processor analyzes the digital image data from the Frame Buffer by means of the Slide Analysis algorithm, and computes the instructions to the Video Mixer, and to the AutoAuditorium Tracking Camera control software.
4) As an optional side-effect, the Processor may also develop an image displaying information related to the Slide Analysis algorithm. This image can be displayed on the Computer console(FIG. 6b).
5) The Processor instructions which are communicated to the Video Mixer are in the form of ASCII RS-232 commands. However, other communication protocols could also be used to communicate with other types of video mixers.
6) The Video Mixer accepts those commands, thereby selecting the video signals, individually or in combination, which become the Selected Video output (FIG. 6c); that is, the program which is recorded and/or broadcast.
7) The video signals which can be used to create the Selected Video may come from the Slide Camera (FIG. 6a), the AutoAuditorium Tracking Camera (FIG. 6d), or other cameras, all of which output their video signals to the Video Mixer.

The overall outline of the AutoAuditorium Director software algorithm is summarized below:

1) Initialize the algorithm.
2) Collect a slide image (video frame) from the Slide Camera.
3) Determine the current video-noise threshold.
4) Determine if there is motion in the slide image.
5) Determine if the projection (image) screen is blank.
6) Show the appropriate images to the remote audience:
   6.1) Select the slide image when there is motion there.
   6.2) Combine the Tracking Camera image and slide image, if possible.
   6.3) Avoid a static slide image that persists for a long time.
   6.4) Avoid a blank slide image.
   6.5) Wait for the Tracking Camera to reposition before displaying its image.
7) Determine whether the appropriate shot for the Tracking Camera is a normal or corner shot.
   7.1) If the appropriate shot has changed, instruct the Tracking Camera to create the appropriate shot.
8) Collect the next slide image.

In order to describe the AutoAuditorium. Director algorithm and its implementation of the Slide Analysis algorithm in detail, it is first necessary to establish a number of terms and definitions in conjunction with the following drawings.

Figure 7:
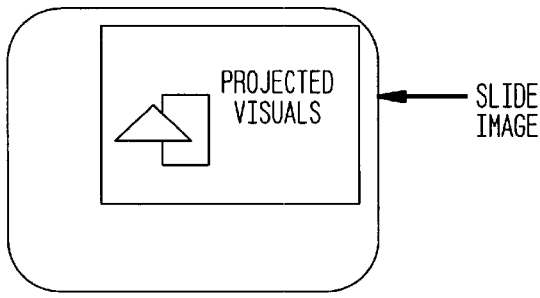
FIG. 7 depicts a slide image taken by the slide camera, which incorporates the shot from FIG. 4.

FIG. 7 illustrates a typical image taken by the Slide Camera, called the "Slide Image". Note that in this example, the projection screen that contains the projected visuals does not occupy the entire Slide Image. With a Video Mixer capable of zooming video effects, however, the projection screen could have filled the Slide Image.

Figure 8:
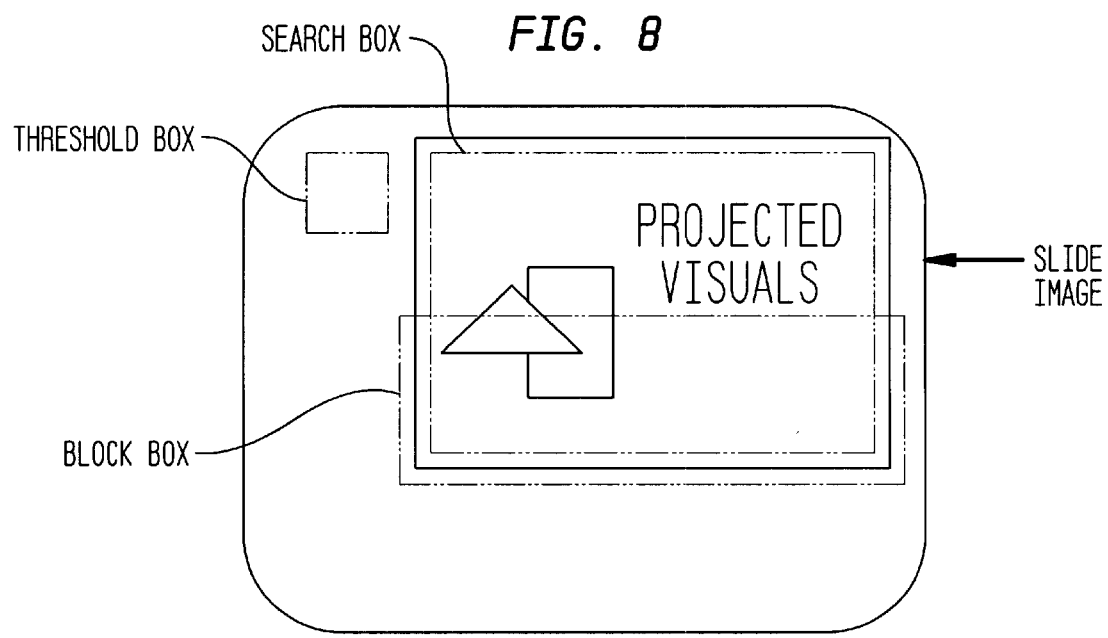
FIG. 8 shows "Boxes" which define key areas of the slide image, in accordance with the invention.

FIG. 8 defines areas of interest within the Slide Image, called "Boxes", which the AutoAuditorium Director algorithm will use. Normally, each Box is defined to the algorithm after the Slide Camera is installed in the room, and these Box definitions are expected to remain constant. However, in some situations, it may be necessary to define several sets of Boxes and select the appropriate set for each use, or to define a specific set of Boxes for a specific use.

In FIG. 8, the Threshold Box is placed so that it covers an area of the Slide Image which is unlikely to see motion, such as an area outside the projection screen and above the height of the person's head. The area within the Threshold Box may be poorly illuminated. The AutoAuditorium Director algorithm uses the Threshold Box to evaluate the video noise in the Slide Image, and thus be insensitive to it.

The Search Box defines the area where the Slide Analysis algorithm will search for the presence or absence of a slide, and roughly corresponds to the area of the projection screen within the Slide Image.

The Block Box defines an area within the Search Box where there is likely to be motion which it is normally desirable to ignore. For example, FIGS. 7–11 illustrate a room where the inventive system is installed, if the person should casually walk in front of the projection screen, such an image would be within the Search Box, and therefore would be seen either as a slide on the projection screen, or as significant motion on the projection screen. The Slide Analysis algorithm ignores motion within the Block Box, except when other motion within the Search Box is adjacent to it. Thus "significant motion" is motion within the Search Box outside the Block Box, and "insignificant motion" is motion within the Search Box that is also totally within the Block Box.

Figure 9:
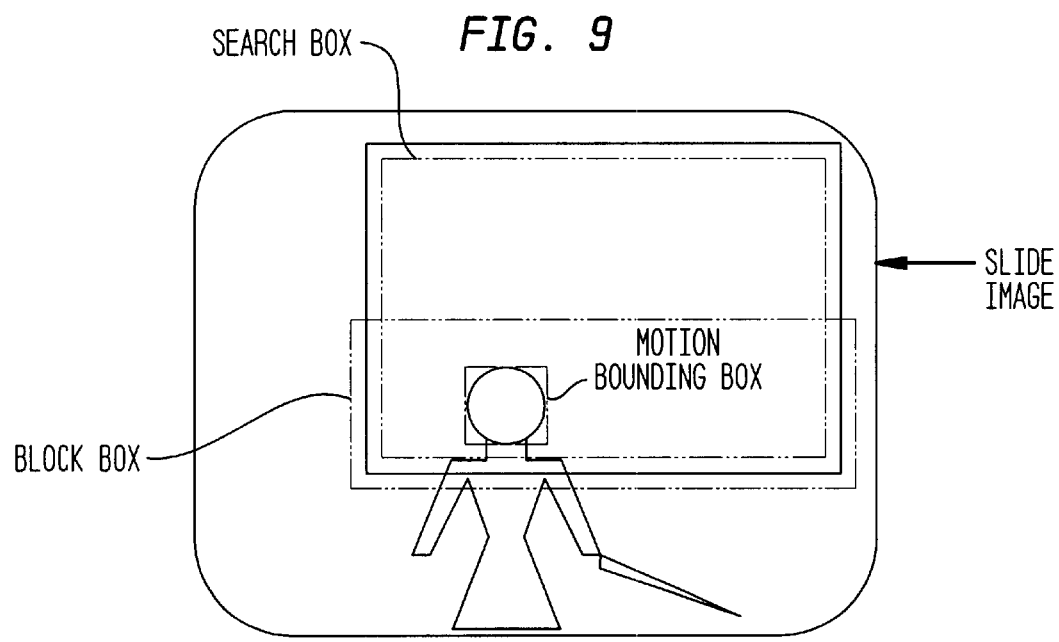
FIG. 9 shows a Motion Bounding Box totally within a Block Box, in accordance with the invention.

The term "Motion Bounding Box" is then defined as the minimum size rectangle which contains all the "Pixel Differences" (to be defined later) within the Search Box which are above the video noise level detected in the Threshold Box. The number of Pixel Differences above the Threshold is associated with the rectangle for later reference. FIG. 9 illustrates the case where the Motion Bounding Box is totally enclosed within the Block Box, which is considered insignificant motion.

Figure 10:
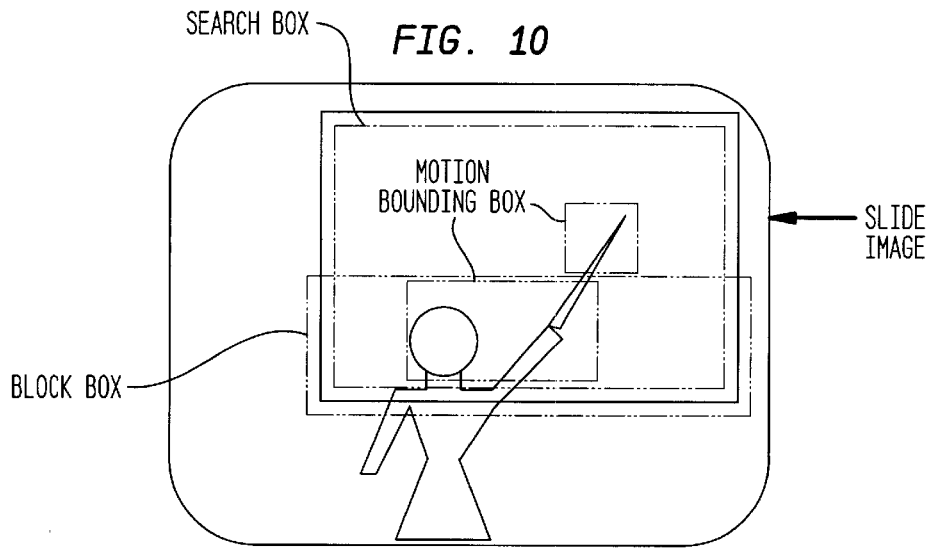
FIG. 10 shows Motion Bounding Boxes split between Block Box and Search Box, in accordance with the invention.
Figure 11:
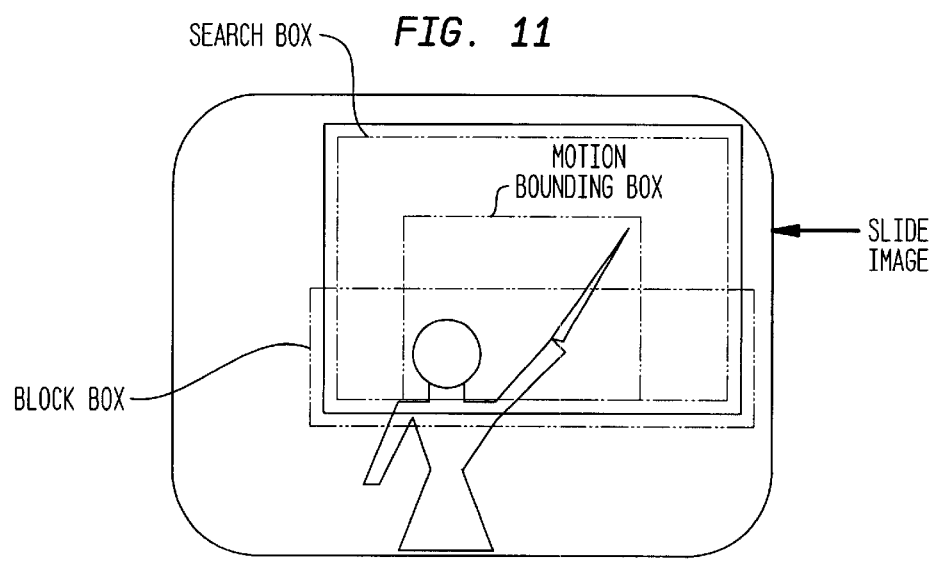
FIG. 11 shows a combined Motion Bounding Box, in accordance with the invention.

In FIG. 10, the Motion Bounding Boxes are shown both within the Block Box and Outside the Block Box. FIG. 11 shows the two Motion Bounding Boxes of FIG. 10 combined into a single Motion Bounding Box. This is the Motion Bounding Box associated with significant motion.

In the current implementation of the AutoAuditorium Director system, each of the above described Boxes is rectangular, and there is only one of each type. In general, however, the shape of each area could be arbitrary, and there could be multiple instances of each of these Boxes within the Slide Image.

The roles of these Boxes will be more fully described as part of the following discussion of the Slide Analysis algorithm.

In order to describe the Slide Analysis algorithm in detail, the following terms have been given the corresponding definitions:

a) Pixel Value . . . The luminance (brightness) value of each pixel. Generally, 0 equals black, and the maximum pixel value (e.g., 255) equals white. Note that while the current inventive embodiment does not use color information, it is capable of doing so.

b) Pixel Difference . . . The absolute value of the difference between two pixel values. Generally, a Pixel Difference is computed between pixels in the same position, but on video frames captured at different times.

c) Threshold . . . The minimum Pixel Difference considered significant. Generally, this is set to be just above the Pixel Difference caused by video noise. Note that other algorithms for determining the level of video noise may be used.

d) Rectangle . . . A rectangular area of the Slide Image, defined by the xmin, xmax, ymin, ymax coordinates from the video frame. In the inventive system, 'x' corresponds to the number of the pixel across a scan line; with xmin on the left, xmax on the right. 'y' corresponds to the number of the scan line; with ymin at the top, ymax at the bottom.

e) Screen State . . . The current state of the projection screen. Possible values are blank, or not blank. On a not blank screen, the Screen State may be either "Not Blank with No Motion" or "Not Blank with Significant Motion".

The following steps initialize the Slide Analysis algorithm, and are only performed once, when the algorithm starts:

a) Set the following initial system parameters during system installation:

| | |
|---|---|
| Threshold Bias | This is the amount added to the measured video noise to create the Threshold. This ensures that only Pixel Differences caused by motion are used to find the Motion Bounding Boxes. The amount of Threshold Bias is determined by experimentation; illustratively, set to a value of 30. |
| Minimum Motion | This is the number of Pixel Differences above the Threshold which must be seen for motion to be considered "significant". The number may be determined by, e.g., experimentation; illustratively, set to 50. |
| Blank Screen Time | This is the number of seconds the screen must be blank before selecting another shot; illustratively, set to 5 seconds. |
| No Motion Time | This is the number of seconds a Not Blank screen must show no motion before selecting another shot. Illustratively, set to 90 seconds. |
| Transition Shot Time | This is the number of seconds it takes for the Tracking Camera to reset to new parameters. | b) Set the Screen State of the projection screen to "Blank".

c) Digitize a video image from the Slide Camera by the Video A-to-D Converter, and store it in the Frame Buffer.

d) Copy the digitized image from the Frame Buffer into the Processor memory, and associate the current clock time with the image. This copy is called the "Previous Image".

Subsequently, the Slide Analysis algorithm loops over the following steps. For each portion of the algorithm, the intent of that portion is described first, and then the steps which accomplish it follow. Each step is labeled with a bold-faced capital letter, such as A.

1) The AutoAuditorium Director algorithm needs an image to compare with the Previous Image.

A An image from the Slide Camera is digitized by the Video A-to-D Converter, and stored in the Frame Buffer.

B The Processor copies that digitized image from the Frame Buffer into its own memory, and associates the current clock time with the image. This copy is called the "Current Image".

2) In an unmoving video image, if we subtract each Pixel Value in the Previous Image from the corresponding Pixel Value in the Current Image, the difference should always be zero. However, in reality there is almost always a non-zero difference, due to:

noise in the camera's imaging element
noise in the camera's imaging circuitry
noise in the wiring
noise in the Video A-to-D Converter's circuitry The AutoAuditorium Director algorithm needs to ignore the noise, and only pay attention to significant differences between the Previous and Current Images.

C The AutoAuditorium Director algorithm computes the maximum Pixel Difference of all the Pixel Differences within the Threshold Box. It then adds the Threshold Bias to the approximate current video-noise level, and designates that value as the Threshold. A Pixel Difference greater than the Threshold will be considered significant. Note that other algorithms for determining the level of video noise may be used.

3) In these steps, the Slide Analysis algorithm determines if there is any motion associated with the projection screen.

D Within the Search Box, the Slide Analysis algorithm looks for Pixel Differences greater than the Threshold between the pixels of the Current Image and the Previous Image.

E Then, separate Motion Bounding Boxes are created for the Pixel Differences within the Block Box, and for those outside the Block Box.

F If there is only a Motion Bounding Box within the Block Box, the Screen State is set to "No Motion".

G If there is a Motion Bounding Box outside the Block Box, and it is adjacent to the Motion Bounding Box inside the Block Box, the two Motion Bounding Boxes are combined into a single Motion Bounding Box.

G If the number of Pixel Differences above the Threshold within the combined Motion Bounding Box is greater than the Minimum Motion value, then "Significant Motion" is detected, and the time of the Current Image is noted as the Motion Time.

4) The Slide Analysis algorithm next looks at the Slide Image to determine if there is a slide present; that is, to see if the projection screen is Not Blank.

By studying the pixels around a given pixel, and looking for significant changes in pixel value, the algorithm can determine if there are enough visible edges in the image to classify the Slide Image as having a slide present (Not Blank), or as a Blank projection screen.

In the following steps, the Slide Analysis algorithm studies the portion of the Current Image within the Search Box in order to determine if the projection screen is Not Blank or Blank:

I Look for sharp edges, that is, sudden changes in luminance value, along each of the scan lines within the Search Box. Ignore pixels within a Motion Bounding Box totally inside the Block Box.

J If more than a "Minimum Edge Count" value of sharp edges are found on any given scan line, designate the projection screen as Not Blank. Otherwise, designate the projection screen as Blank.

K If the projection screen has changed a designated state, note the time of the Current Image as both the Motion Time and the Change Time.

L Using the time of the Current Image as "now", compute the time elapsed since the last Change Time, and the time elapsed since the last Motion Time.

5) Based on the presence or absence of a slide in the Slide Image, and the presence or absence of motion within the Slide Image, the AutoAuditorium Director algorithm shows appropriate images, selected from images of the person, the slide, and optional other image sources, to the remote audience members. It does this by sending instructions to the Video Mixer such that:

It shows the Slide Image quickly when it changes or when the person points to it.

It does not show the Slide Image when it is Blank for a moderate amount of time.

It cycles between showing and not showing the Slide Image when the projection screen is Not Blank, but has not seen Significant Motion for a long period of time.

The intent is to show the appropriate images to the remote audience, based on whether or not the Slide Image contains "something interesting." That is, "something interesting" can be defined as:

A recent change in the Slide Image;

Significant motion within the Slide Image;

The person giving the talk;

Other shots.

The following "rules" and comments apply to these definitions:

5.1) Select the Slide Image when there is motion there.

M Whenever the Slide Image changes, or whenever there is motion within the portion of the Search Area which is outside the Block Box, show the Slide Image to the remote audience.

5.2) Combine the Tracking Camera Image and Slide Image if possible.

Figure 12:
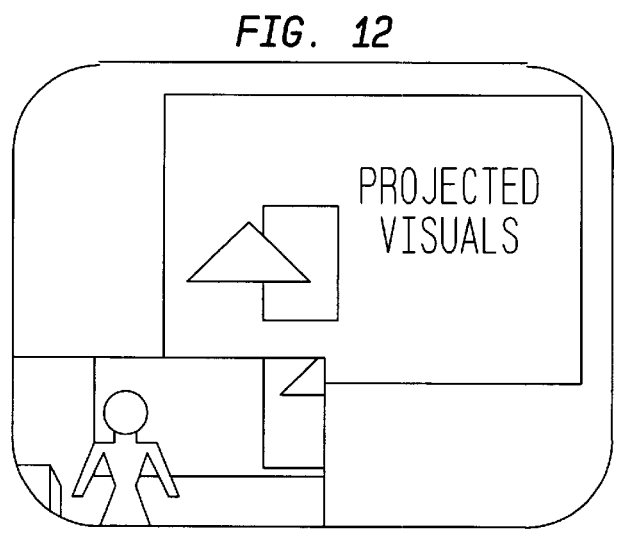
FIG. 12 shows a slide image combined with a corner image of the speaker (combination shot), which incorporates the shot from FIG. 5, in accordance with the invention.

FIG. 12 illustrates the manner in which the inventive system combines the image of the person and the image of the slide, so that the remote audience can view both at the same time.

5.3) Avoid a static Slide Image that persists for a long time.

Lack of motion within the Search Box of the Slide Image for the No Motion Time (90 seconds in the illustrative embodiment) suggests that the person is not actively referring to the slide. Moreover, the remote audience has had plenty of time to study the Slide Image, and presumably remembers it well enough that removing the Slide Image will not seem unreasonable to them.

N If the Screen State has been No Motion for No Motion Time seconds (90 seconds in the illustrative embodiment), then select another image, such as just the person giving the talk.

5.4) Avoid a blank Slide Image.

O Whenever the Screen State is blank for Blank Screen Time seconds (5 seconds in the illustrative embodiment), then select another image, such as just the person giving the talk.

5.5) Wait for the Tracking Camera to reposition before showing its image.

In the inventive system, the same AutoAuditorium Tracking Camera which puts the person in the corner of FIG. 12 is used to look at just the person. When transitioning from the former shot to the latter, or back, the Tracking Camera motion is not shown as it changes from corner mode to normal mode, and back.

For the case of transitioning from the Combination Shot shown in FIG. 12 to a shot of just the person, the inventive system shows another image, such as a wide shot of the entire stage area, which can be taken with a different camera, other than the Tracking Camera or the Slide Camera. While this shot is shown, the AutoAuditorium Director software instructs the Tracking Camera to switch from corner shot to normal shot. After waiting Transition Shot Time (8 seconds in the illustrative embodiment) for the Tracking Camera to adjust to its new parameters, the Video Mixer is instructed to select the Tracking Camera.

P When instructed to change from the Combination Slide and Tracking Camera Shot to the Tracking Camera shot, the AutoAuditorium Director algorithm first instructs the Video Mixer to select another camera shot, called a Transition Shot. It then instructs the Tracking Camera subsystem to change from corner mode (where the person is shown in the corner of the Tracking Camera Image) to normal mode (where the person is shown in the center of the Tracking Camera Image). After Transition Shot Time seconds, the AutoAuditorium Director algorithm then selects the Tracking Camera shot.

For the case where it is desired to go back to the Combination Shot, the inventive system instantly brings up the Slide Image alone (without the person in the corner). It then instructs the Tracking Camera to switch to the corner shot.

Then, after the Tracking Camera has adjusted to its new parameters, the system shows the Combination Shot.

Q When instructed to change from the Tracking Camera shot to the Combination shot, the AutoAuditorium Director algorithm first instructs the Video Mixer to select the Slide Image shot alone. It then instructs the Tracking Camera subsystem to change from normal mode to corner mode. After Transition Shot Time seconds, the AutoAuditorium Director algorithm then selects the Combination shot.

6) Collect the next Slide Image.

R Return to Step A.

In short, an automatic camera control method and apparatus is disclosed for recording an auditorium type of presentation, including a speaker and visual aids, for display to a remote audience. Moreover, the disclosed invention is completely automated, so that there is no need for an operator.

The above described embodiments of the invention are intended to be illustrative only. Numerous alternative embodiments may be devised by those skilled in the art without departing from the spirit and scope of the following claims.

What is claimed is:

1. A method for automatically video recording a presentation for displaying to a remote location, including composite images of a presenter and a visual aid, such as a projected slide image, comprising the steps of:
   a) setting predetermined initial parameters and slide analysis criteria,
   b) collecting a slide image, where said slide image is a video frame obtained from a slide camera,
   c) determining a current video-noise threshold,
   d) determining if there is motion in said slide image,
   e) determining if said slide image is blank or not,
   f) selecting and displaying appropriate images to said remote audience,
   wherein said slide image is selected when said slide image is non-blank and there is motion therein.

2. The method of claim 1, further comprising the step of:
g) collecting a presenter image, where said presenter image is a video frame obtained from a tracking camera,
   wherein said composite images include a combination of said presenter image and said slide image, and
   wherein said presenter image is withheld from display while said tracking camera is being repositioned.

3. The method of claim 1 wherein said initial parameters of step a) include Threshold Bias, Minimum Motion, Blank Screen Time, No Motion Time, and Transition Shot Time.

4. The method of claim 1 wherein step b) further comprises:
   digitizing a first video image from said slide camera and storing it in a Frame Buffer,
   copying said digitized first video image from said Frame Buffer into a processor memory, and associating said copied first image with a corresponding first clock time, said copied first image being designated as a Previous Image,
   digitizing a second video image from said slide camera and storing it in said Frame Buffer,
   copying said digitized second video image from said Frame Buffer into said processor memory, and associating said copied second image with a corresponding second clock time, said copied second image being designated as a Current Image.

5. The method of claim 1 wherein step c) further comprises:
   computing a Maximum Pixel Difference of all pixel differences between said Previous Image and said Current Image within corresponding Threshold Box areas of said Previous Image and said Current Image, wherein said Threshold Box encompasses an area in which no motion is anticipated,
   adding said Threshold Bias to said Maximum Pixel Difference to determine a current video-noise level, which is designated as a Threshold Value.

6. The method of claim 1 wherein step d) further comprises:
   within corresponding Search Box areas of said Previous Image and said Current Image, wherein said Search Box encompasses an image area to be evaluated for motion, determining if respective Pixel Differences exceed said Threshold Value,
   designating a Block Box area within said Current Image wherein said Block Box encompasses an area in which motion is to be ignored, except when other motion within said Search Box is adjacent to said Block Box,
   designating one or more Motion Bounding Box areas within said Block Box area and outside said Block Box area, wherein said Motion Bounding Box encompasses a minimum size rectangular area which contains all the Pixel Differences within said Search Box which exceed said Threshold Value,
   wherein when there is only a Motion Bounding Box within said Block Box, said Search Box is considered to have no motion,
   wherein when there is a Motion Bounding Box outside said Block Box and it is adjacent to a Motion Bounding Box inside said Block Box, combining said Motion Bounding Boxes into a single Combined Motion Bounding Box, and
   if the number of Pixel Differences above said Threshold Value within said Combined Motion Bounding Box is greater than said Minimum Motion value, said slide image is considered to have motion, and the time of said Current Image is designated as Motion Time.

7. The method of claim 1 wherein step e) further comprises:
   counting the number of sudden changes in pixel luminance value along each of a plurality of pixel scan lines of said Current Image within said Search Box, except that pixels within said Motion Bounding Box are ignored,
   wherein when said number of sudden luminance changes on any of said pixel scan lines outside said Motion Bounding Box exceed a predetermined Minimum Edge Count, said slide image is considered to be in a not blank state,
   otherwise, said slide image is considered to be in a blank state,
   wherein when said Current Image changes from one said state to the other, designating the time of said change as both Motion Time and Change Time, and
   computing an elapsed time difference between a present Current Image and a previous Motion Time and Change Time.

8. The method of claim 1 wherein step f) further comprises:
   not showing said slide image if said slide image is in a no motion state for a time period in excess of a predetermined value of said No Motion Time, and not showing said slide image if said slide image is in a blank state for a time period in excess of a predetermined value of said Blank Screen Time, wherein when said slide image is not being shown, selecting another image for display, such as said presenter image.

9. A method for automatically video recording a presentation for displaying to a remote location, including images of one or more visual aids, such as projected slide images, comprising the steps of:
   a) setting predetermined initial parameters and slide analysis criteria,
   b) collecting a slide image, where said slide image is a video frame obtained from a slide camera,
   c) determining a current video-noise threshold,
   d) determining if there is motion in said slide image,
   e) determining whether said slide image is blank,
   f) selecting and displaying appropriate images to said remote audience,
   wherein said slide image is selected when there is motion therein,
   wherein static or blank slide images are avoided, and
   wherein said method is fully automatic, and does not require an operator.

10. The method of claim 9 wherein said initial parameters of step a) include Threshold Bias, Minimum Motion, Blank Screen Time, No Motion Time, and Transition Shot Time.

11. The method of claim 9 wherein step b) further comprises:
   digitizing a first video image from said slide camera and storing it in a Frame Buffer,
   copying said digitized first video image from said Frame Buffer into a processor memory, and associating said copied first image with a corresponding first clock time, said copied first image being designated as a Previous Image,
   digitizing a second video image from said slide camera and storing it in said Frame Buffer,
   copying said digitized second video image from said Frame Buffer into said processor memory, and associating said copied second image with a corresponding second clock time, said copied second image being designated as a Current Image.

12. The method of claim 9 wherein step c) further comprises:
   computing a Maximum Pixel Difference of all pixel differences between said Previous Image and said Current Image within corresponding Threshold Box areas of said Previous Image and said Current Image, wherein said Threshold Box encompasses an area in which no motion is anticipated,
   adding said Threshold Bias to said Maximum Pixel Difference to determine a current video-noise level, which is designated as a Threshold Value.

13. The method of claim 9 wherein step d) further comprises:
   within corresponding Search Box areas of said Previous Image and said Current Image, wherein said Search Box encompasses an image area to be evaluated for motion, determining if respective Pixel Differences exceed said Threshold Value, by
   designating a Block Box area within said Current Image wherein said Block Box encompasses an area in which motion is to be ignored, except when other motion within said Search Box is adjacent to said Block Box,
   designating one or more Motion Bounding Box areas within said Block Box area and outside said Block Box area, wherein said Motion Bounding Box encompasses a minimum size rectangular area which contains all the Pixel Differences within said Search Box which exceed said Threshold Value,
   wherein when there is only a Motion Bounding Box within said Block Box, said Search Box is considered to have no motion,
   wherein when there is a Motion Bounding Box outside said Block Box and it is adjacent to a Motion Bounding Box inside said Block Box, combining said Motion Bounding Boxes into a single Combined Motion Bounding Box, and
   if the number of Pixel Differences above said Threshold Value within said Combined Motion Bounding Box is greater than said Minimum Motion value, said slide image is considered to have motion, and the time of said Current Image is designated as Motion Time.

14. The method of claim 9 wherein step e) further comprises:
   counting the number of sudden changes in pixel luminance value along each of a plurality of pixel scan lines of said Current Image within said Search Box, except that pixels within said Motion Bounding Box are ignored,
   wherein when said number of sudden luminance changes on any of said pixel scan lines outside said Motion Bounding Box exceed a predetermined Minimum Edge Count, said slide image is considered to be in a not blank state,
   otherwise, said slide image is considered to be in a blank state,
   wherein when said Current Image changes from one said state to the other, designating the time of said change as both Motion Time and Change Time, and
   computing an elapsed time difference between a present Current Image and a previous Motion Time and Change Time.

15. The method of claim 9 wherein step f) further comprises:
   not showing said slide image if said slide image is in a no motion state for a time period in excess of a predetermined value of said No Motion Time, and
   not showing said slide image if said slide image is in a blank state for a time period in excess of a predetermined value of said Blank Screen Time,
   wherein when said slide image is not being shown, selecting another image for display.

16. An apparatus for automatically video recording a presentation for displaying to a remote location, including images of one or more visual aids, such as projected slide images, comprising:
   a slide camera, capable of viewing said visual aids, and being able to generate corresponding slide video signals therefrom,
   a system computer, comprising:
      a processor, for controlling said video recording apparatus,
      a slide Frame Buffer, and
      a slide Video A-to-D Converter,
   wherein said slide camera generates slide video signals to said Video Mixer, and also to said slide Video A-to-D Converter, wherein said slide Video A-to-D Converter digitizes said slide video signals, and stores said digitized video signals in said slide Frame Buffer, wherein said processor analyzes said digitized video signals stored in said slide Frame Buffer, and generates image selection instructions to said Video Mixer, wherein said Video Mixer selects said slide video images received from said slide camera, in accordance with said image selection instructions, for display to said remote audience, and wherein said apparatus is fully automatic, and does not require an operator.

17. The apparatus of claim 16, further comprising:

a slide Video Distribution Amplifier, connected to a slide video signal output of said slide camera, and a Video Mixer, connected to an output of said slide Video Distribution Amplifier, wherein said slide camera outputs said slide video signal to said slide Video Distribution Amplifier.

18. The apparatus of claim 15 wherein said Video Mixer may receive additional video signal inputs from camera sources other than said slide camera.

19. The apparatus of claim 16 wherein said computer further comprises a display screen, and wherein said processor develops information relating to said analysis of said digitized video signals for display on said computer display screen.

* * * * *